United States Patent [19]
Bristol

[11] 3,721,824
[45] March 20, 1973

[54] APPARATUS AND METHOD FOR ADJUSTING GAIN OF PHOTOMULTIPLIER TYPE SCINTILLATION DETECTORS

[75] Inventor: Stanley M. Bristol, Glen Ellyn, Ill.

[73] Assignee: Packard Instrument Company, Inc., Downers Grove, Ill.

[22] Filed: April 10, 1967

[21] Appl. No.: 629,462

[52] U.S. Cl. .........250/71.5 R, 250/106 SC, 250/207
[51] Int. Cl. ...............................................G01t 1/20
[58] Field of Search ................250/71.5, 106 SC, 207

[56] References Cited

UNITED STATES PATENTS

| | | |
|---|---|---|
| 3,091,463 | 5/1963 | Cohen et al. ........................250/71.5 |
| 3,101,409 | 8/1963 | Fite .......................................250/71.5 |
| 3,114,835 | 12/1963 | Packard ...............................250/71.5 |
| 3,188,468 | 6/1965 | Packard ............................250/106 SC |

*Primary Examiner*—Morton J. Frome
*Attorney*—Wolfe, Hubbard, Leydig, Voit & Osann

[57] ABSTRACT

Photomultiplier type scintillation detectors are normalized, or adjusted to constant gain characteristics, independent of the high voltage applied to the photomultiplier. The normalized photomultiplier circuit is particularly useful in coincidence counting in liquid scintillation spectrometry, especially where the circuit is of the summation type. The inventive system has special application to apparatus for externally standardizing the spectrometer output to compensate for sample quench effects.

22 Claims, 9 Drawing Figures

INVENTOR
STANLEY M. BRISTOL,
BY
Wolf, Hubbard, Voit & Osann
ATTORNEYS.

APPARATUS AND METHOD FOR ADJUSTING GAIN OF PHOTOMULTIPLIER TYPE SCINTILLATION DETECTORS

CROSS-REFERENCE TO RELATED APPLICATIONS

Robert E. Cavanaugh Ser. No. 541,721, filed Apr. 11, 1966 U.S. Pat. No. 3,499,149.

BACKGROUND OF THE INVENTION

The present invention relates in general to a method and apparatus particularly useful in detecting and measuring radioactivity emanating from a radionuclide-containing source and, more particularly, to a system for normalizing such apparatus to compensate for gain changes in the transducer. In its primary aspect, the invention is concerned with radioactivity detecting and measuring apparatus employing two photomultiplier detectors for solid or liquid scintillation detection, and is particularly advantageous when the apparatus employs a summation-type circuit and/or external standardization to compensate for quench effects in the sample.

Modern apparatus for detecting and measuring radioactivity has reached an unusually high state of development. Systems are available commercially which offer unusual sensitivity to low energy radiation, excellent precision and accuracy, and the convenience of fully automatic operation. Developments in apparatus and technique have been truly remarkable.

As is frequently the case however, the apparatus which leaves the manufacturer may lose its adjustment in use due to inherent instability of various electrical, mechanical, or optical components. Photomultiplier tubes, which are conventionally employed as transducers or detectors in liquid and solid scintillation spectrometers, experience a gain in amplification characteristics with time, the gain generally increasing rapidly at the outset and thereafter more slowly but nonetheless persistently. As will be shown, this change in photomultiplier tube gain may have serious effects on the validity of radioactivity detection and measurement in the types of circuitry commonly used for radiation counting. Its effects are particularly disturbing in counting such frequently used low energy nuclides such as tritium (maximum beta energy of 0.018 mev.) and carbon-14 (maximum beta energy of 0.15 mev.), especially when the radionuclide is in low concentration. It is accordingly a general aim and object of the present invention to provide an improved radioactivity spectrometry method and apparatus in which counting errors due to changes in photomultiplier tube gain are eliminated by normalizing the tube circuit, that is, returning the tube to a predetermined or standardized gain level. An associated object is to provide a photomultiplier tube circuit having provisions for normalizing the tube gain, which normalization is effected without altering the high voltage input to the photomultiplier tube.

Changes in photomultiplier tube gain are even more troublesome in radioactivity spectrometers utilizing coincidence counting, that is, simultaneous observation of scintillations produced by radioactivity decay events with a pair of photomultiplier tube detectors, and which record a count only when both detectors indicate the simultaneous receipt of a scintillation. For optimum performance, such coincidence counting circuits require two photomultiplier tubes which are balanced with respect to each other so that the output pulses of each tube observing a scintillation will be as nearly the same as possible. While not so limited in its application, an additional object of the invention is to provide a means for normalizing one or both photomultiplier tubes in such coincidence counting circuits so that the output of the tubes as they observe a decay event, or the scintillation therefrom, can be made substantially identical.

Additionally, where the coincidence counting uses summation-type circuitry, that is, output pulses from each photomultiplier tube are added together, unbalanced tube outputs defeat the purposes of summation-type circuitry and lose the advantages thereof. In particular, summation-type circuits represent a significant improvement over earlier circuits as they use the entire light output of each scintillation, with the result that the amplitude of each event is doubled, and correspondingly the signal-to-noise ratio is improved by an approximate factor of 1.4. Thus, with summation-type circuits a higher threshold can be used. Further, summation-type circuits improve the separation or resolution between a plurality of peaks on a spectral curve containing two or more beta emitting radionuclides. Again, while not so limited, a further object and advantage of the invention is to provide a system whereby the full benefits of summation-type circuitry are realized and whereby difficulties resulting from unbalanced photomultiplier tube outputs are obviated.

Still another particular application of the present invention is in connection with the use of external high-energy gamma-emitting radionuclides as external standards to compensate for quench effects in a sample. Such external standards provide, in comparison with internal standardization, such important features as more rapid determination, no sample contamination, reduced opportunity for technician error, and independence of sample activity. However the sensitivity of external standardization apparatus to quench effects concurrently renders the apparatus sensitive to changes in photomultiplier tube gain, and it is accordingly still another object of the invention to provide a radioactivity spectrometer utilizing external standardization whereby the external standardization determination, and thus the final determination of sample activity, are free of aberrations caused by irregular photomultiplier tube gain.

An overall object of the present invention is to provide a photomultiplier tube circuit particularly adapted for use in scintillation monitoring apparatus of the type having a photomultiplier tube supplied with high voltage, one or more amplifiers to amplify the output of the photomultiplier tube, and one or more amplitude discriminators to select a predetermined range of outputs, and to regulate the spectrometer without necessarily changing the high voltage applied to the photomultiplier tube, the amplifier gain, or the discriminator settings. As a consequence of attaining this object, expensive high voltage potentiometers or attenuators at the photomultiplier tube input or output terminals are eliminated, and a constant voltage is applied to the photomultiplier tubes so as to avoid changes in tube characteristics due to differing input voltages.

Other objects and advantages of the invention will become apparent as the following description proceeds, taken in conjunction with the accompanying drawings in which:

FIG. 1 is a generalized diagrammatic block-and-line representation of a simplified prior radioactivity spectrometer;

FIG. 2 is a diagrammatic block-and-line representation of a conventional coincidence type liquid scintillation spectrometer particularly suited for detecting and measuring the less penetrating alpha or beta particles emanating from radioactive isotopes, and is shown in its adaptive form as capable of detecting and measuring the radiation emanating from a plurality of different nuclides within a sample;

Figure 8:
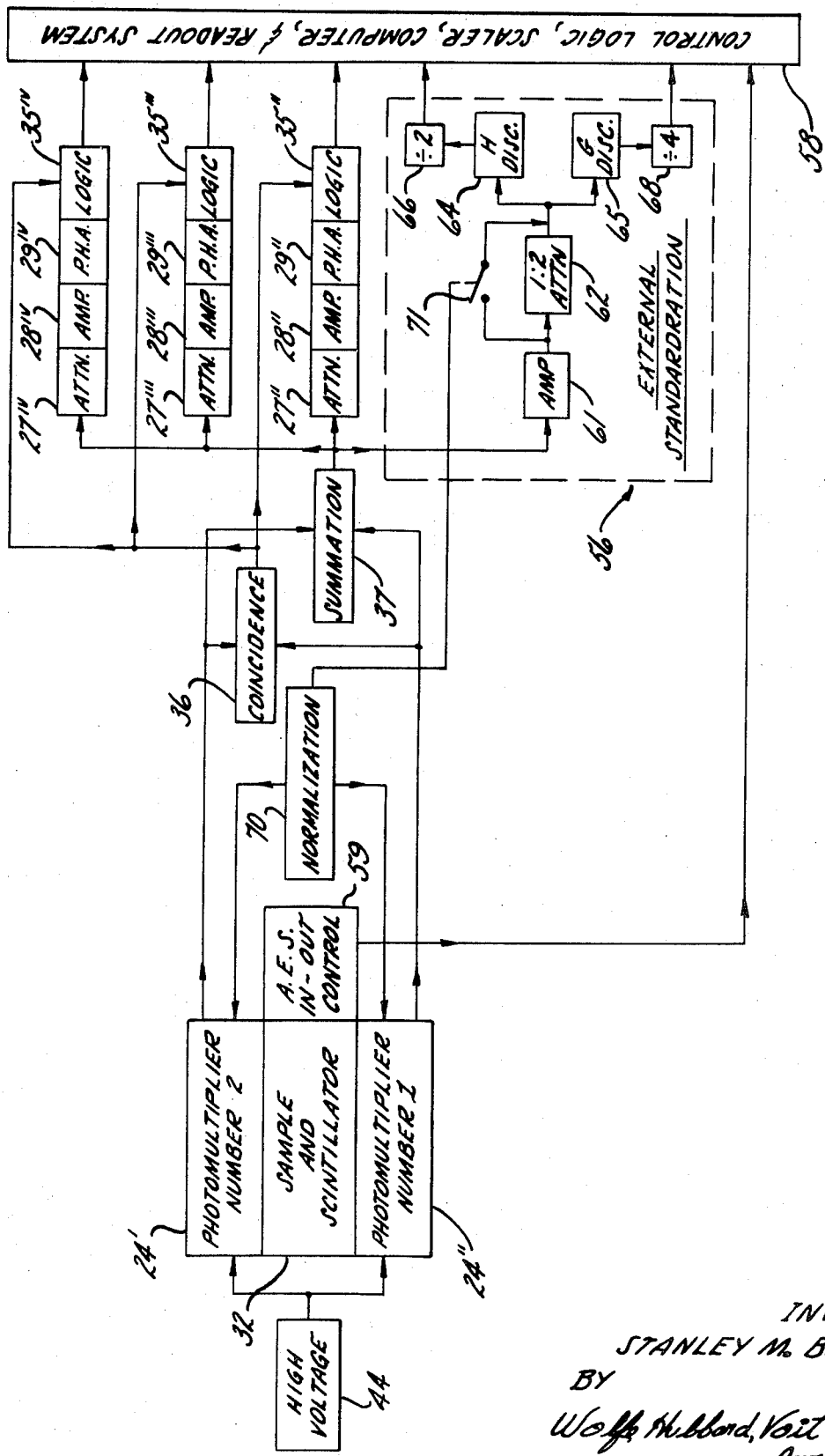
Figure 9:
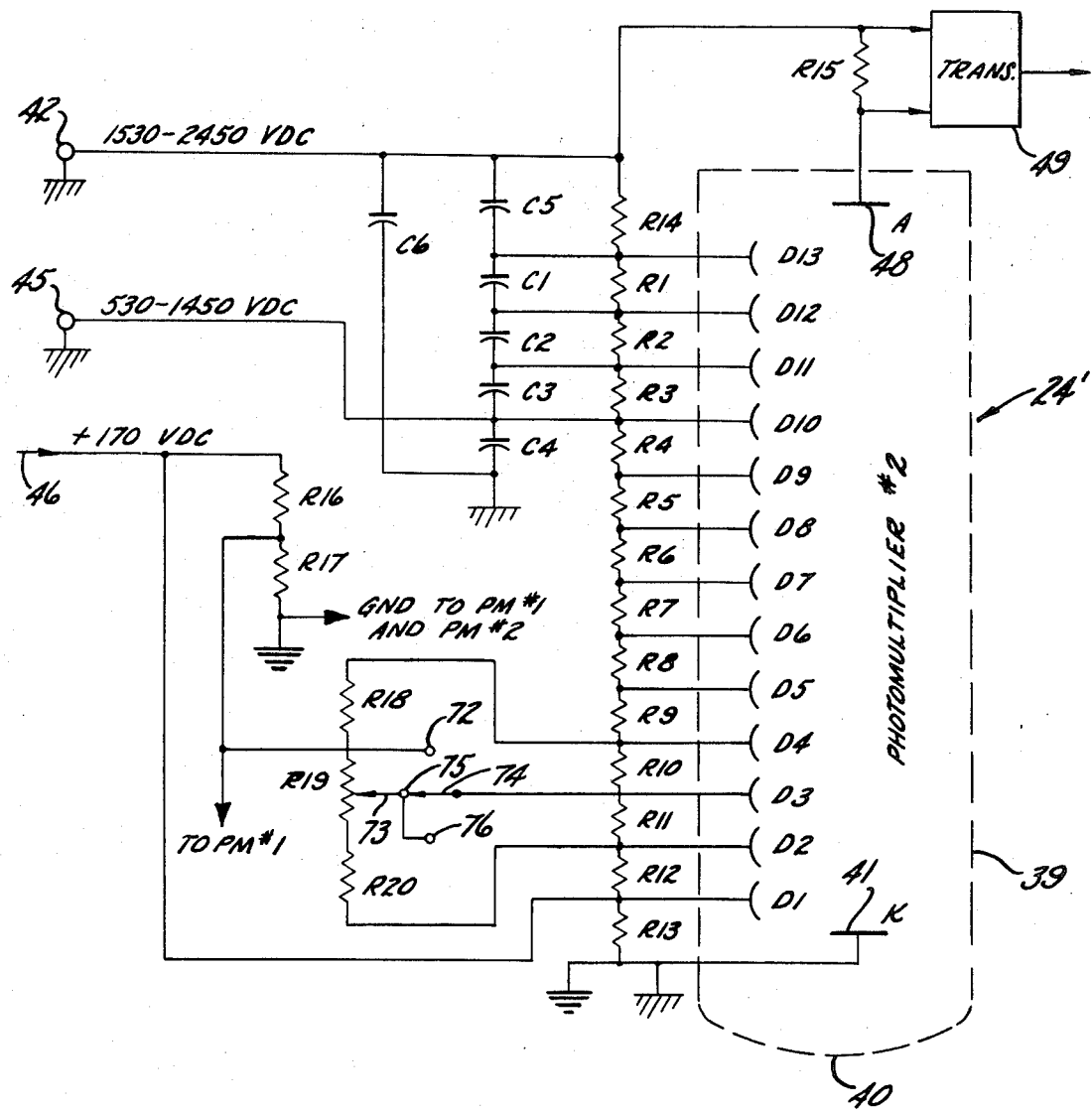

FIG. 8 is a diagrammatic block-and-line representation of a multiple channel scintillation spectrometer embodying coincidence counting, summation-type circuitry, automatic external standardization, and normalization according to the present invention; and FIG. 9 is a schematic diagram, partly in block-and-line form, of an exemplary photomultiplier including the normalization system of the present invention.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

THE ENVIRONMENT OF THE INVENTION

Before treating the present invention in detail, it will be helpful first to consider briefly the prior art background or environment. In radioactivity measurements, it is the most frequent objective to determine the rate at which decay events in an isotope present in a radioactive source occur, this rate generally being expressed as counts per unit time, e.g., counts per minute. The quantity of a particular isotope present in a radioactive source is in general proportional to the rate of decay events produced by that isotope, such rate being termed the "activity level" of the source. As a generalization, the decay events or radiation emanations from a radioactive source are, for purposes of measurement or counting, converted into corresponding voltage or current pulses which can then be counted. The pulses may be counted for a predetermined time, or a predetermined number of pulses may be counted, the ratio of counted pulses to the elapsed time period being indicative of the activity level. In some instances the voltage pulses may be fed to a direct-reading or recording rate meter which indicates the activity level.

a. General Organization and Operation of Spectrometer

Figure 1:
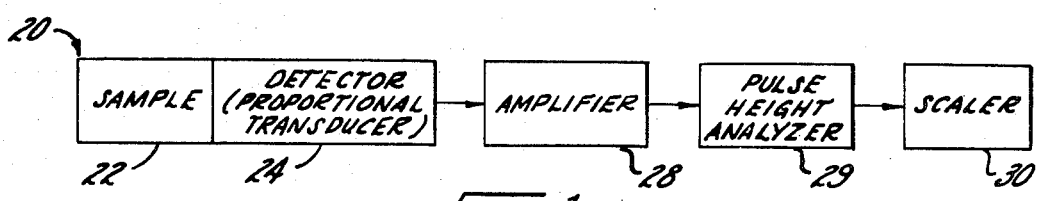

The spectrometer illustrated diagrammatically at 20 in FIG. 1 includes a radioactive source 22 disposed in operative relationship to a detector or proportional transducer 24, the latter serving to convert radiation from decay events within the source 22 into corresponding electrical signals, e.g., voltage pulses. The transducer may be any one of a variety available in the art, such for example as a sodium iodide (thalium activated) crystal for converting radioactive decay events into light flashes. A transducer comprised of such a scintillation crystal and a photomultiplier for converting light flashes into voltage pulses is suitable for detecting radiation from gamma-emitting isotopes; but still other transducers constituting a source of pulses may be employed for different specific applications. Regardless of the particular type of detector and transducer employed, it should have a proportional characteristic, i.e., each voltage pulse will be substantially proportional to the energy of the decay event which produces it.

The voltage pulses so derived by the detector or transducer 24 are, however, of relatively low amplitude. It is impractical, if not impossible, to discriminate these pulses on the basis of differences in their amplitudes and to count or measure their rate of occurrence. Accordingly, the pulses from the detector 24 are first passed through a linear amplifier 28 and then supplied to a pulse height analyzer 29. Because the pulses received by the analyzer have been amplified and thus occupy a fairly wide spectrum of amplitudes, the analyzer 28 may select only these pulses which lie above or below certain preselected amplitudes, and pass them to a final indicating device such as a rate meter or a scaler, the latter being shown at 30. By adjusting the amplitude band or "window" of pulse amplitudes passed by the analyzer 29, the background pulses (resulting either from spurious radiation, cosmic rays, or noise in the transducer) can be substantially reduced, so that the count received by the scaler is comprised principally of pulses resulting from the activity of the source being measured. The background pulses to a large extent have amplitudes that fall outside the acceptance band of the analyzer after the latter has been adjusted. The background count passed by the analyzer may, of course, be measured for a given time interval with no radioactive source present, and then subtracted from subsequent scaler counts received with radioactive sources present.

Because the pulses applied to the input of the analyzer 29 have amplitudes substantially proportional to the energy of corresponding decay events in the source 22, the analyzer may be adjusted successively to pass bands of pulse amplitudes, and the energy spectrum of the decay events in an isotope thus plotted. Once that spectrum has been measured, or is known, the analyzer 29 may be set to pass an amplitude band or window in which a fairly large proportion of all pulses derived from the isotope decay events are passed and counted, yet in which the background or spurious pulses passed to the scaler are relatively few. The proportion of pulses counted from source decay events to the total number of decay events in the source is termed the "efficiency" of counting. It is generally accepted that the optimum counting conditions are obtained, i.e., statistically accurate results produced with reasonably low total counts and in relatively short counting time periods, when the ratio $E^2/B$ is made substantially a maximum (where E represents the efficiency of counting pulses derived from an isotope, and B represents the background count).

b. Liquid Scintillation and Coincidence Monitoring

In spectrometry involving isotopes which produce radiation particles having relatively low penetrating power, and particularly with samples or sources of low activity levels, the detector or transducer may preferably comprise a solution of liquid scintillator into which the radioactive substance is added. Light flashes in this solution, resulting from decay events of the isotope, are transmitted to a photosensitive electrical device, preferably a photomultiplier tube. Because such photomultiplier tubes are to an undesirable degree prone to produce spurious voltage pulses due to "dark noise current" which is primarily caused by thermally induced electron emission, it has been common practice to employ "coincidence monitoring" in order to preclude counting of these spurious voltage pulses. Such a liquid scintillation spectrometer with coincidence monitoring, and intended primarily for work with alpha and beta radiation isotopes, is diagrammitically illustrated in FIG. 2.

Figure 2:
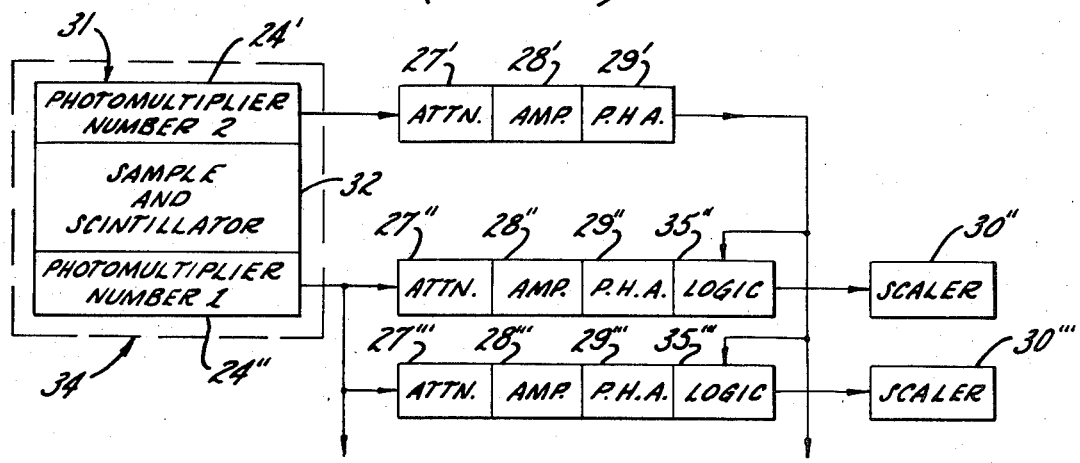

Referring to FIG. 2, the radioactive source is shown at 32 as a sample of isotope-containing substance dissolved or suspended in a liquid scintillator, the latter being in a container having light-transmissive walls. Aromatic ethers are commonly employed as solvents, although numerous other solvents are known in the art. Any one of numerous commercially obtainable scintillators or fluorescent materials is also dissolved in the solvent for the purpose of converting the radiant energy resulting from a decay event (for example, an alpha or beta decay event) into light energy. Finally, the sample includes the radioactive material, which is or contains a radionuclide or isotope, to be measured. The emission energy spectra of the different radionuclides may vary greatly, each having a characteristic known spectrum. Such spectral characteristics are fully described in the scientific literature.

Where the maximum beta energy of the radionuclide is relatively low, typified by tritium (maximum beta energy of 0.018 mev.), carbon-14 (0.15 mev.), and up to phosphorus-32 (1.71 mev.) or so, the light flashes in the scintillator solution are relatively weak, although proportional in intensity to the energy of the decay events which produce them. It is for this reason that a very sensitive light-to-voltage transducer, such as the relatively high gain photomultiplier tube, is employed, and coincidence monitoring is utilized to reduce the effects of noise pulses therein.

Referring more specifically to FIG. 2, the spectrometer 31 there illustrated includes a pair of photomultipliers 24', 24" which are placed contiguous with, or adjacent to the sample 32 and energized from a variable high voltage source, not shown for reasons of simplicity and clarity. The photomultipliers 24" and 24' serve the respective functions of providing pulses to be analyzed and pulses to "monitor" or gate the first pulses when both photomultipliers simultaneously respond. The outputs of the photomultipliers 24', 24" may, if desired, be preamplified through preamplifiers, not shown, if the output from the respective photomultipliers is insufficient, but with present day (1967) high gain photomultipliers such preamplifiers may frequently be omitted.

In order to reduce the number of thermal noise pulses in the photomultipliers, the sample 32, the photomultipliers 24', 24", and the optional preamplifiers are advantageously all located within a cooled chamber or freezer, diagrammatically illustrated at 34. The outputs of the photomultipliers 24', 24", or of their associated preamplifiers, are respectively coupled to optional attenuation unit 27' and one or more optional attenuation units 27", 27''', which in turn feed to amplifiers 28', 28", 28''', respectively. The amplified outputs from these amplifiers are further passed to pulse height analyzers 29', 29", 29''', respectively, each of which provides an input signal for a suitable logic circuit which, for example, may simply be an AND gate. As shown in FIG. 2, the output of pulse height analyzer 29' and that of pulse height analyzer 29" are fed to logic circuit 35" which is coupled directly to scaler 30". Similarly, the output of pulse height analyzer 29' is also coupled, along with that of pulse height analyzer 29''', to logic circuit 35''' which feeds into scaler 30'''. Additional channels, each composed of an attenuation unit, an amplifier, a pulse height analyzer, and a logic circuit connected to pulse height analyzer 29' and thence to a scaler, may be provided to accommodate additional channels for simultaneously counting a sample containing more than two different radionuclides.

When a decay event (for example, a beta emission) occurs in the sample 32, a light scintillation is produced that is simultaneously detected by both photomultipliers 24', 24". Correspondingly, electrical signal pulses proportional in amplitude to the energy of the decay event (i.e., the amount of light observed by the respective photomultipliers) are simultaneously produced at the output of the amplifiers 28', 28" (and additional amplifiers which may be in additional counting channels). These pulses are then analyzed in pulse height analyzers 29' and 29", at least the latter of which being adapted so that it may pass only a selected band of pulses. The analyzer 29' however preferably is constructed and adjusted to pass all received pulses which exceed a predetermined low amplitude, and need not be restricted as to the upper amplitude of passed pulses. Only when the analyzers 29', 29" provide coincident, or simultaneous, input pulses to the AND gate in logic circuit 35'' does the latter produce an output pulse which is counted by the scaler 30''. If, on the other hand, coincident inputs are not present at the AND gate, any pulse from either pulse height analyzers 29', 29'' is blocked from, and therefore not counted by, the scaler 30''. By way of example, when a thermal pulse is generated in either one of the photomultipliers, coincident input signals will not be present at the AND gate of logic circuit 35'' and hence no count will be recorded by the scaler 30'' even if the thermal pulse is within the amplitude band or window being passed by the associated analyzer.

c. Multiple Labeled Measurements and Multiple Channel Circuit

As further shown in FIG. 2, the above-described liquid scintillation and coincidence monitoring circuit may be adapted to detect and measure the radioactivity emanating from a plurality of radionuclides within a single sample, the detection and measuring of the radioactivity from each nuclide or isotope being performed simultaneously. The above-described circuit of FIG. 2 may, for this purpose, include an additional counting channel composed of attenuation unit 27''', amplifier 28''', pulse height analyzer 29''', logic circuit 35''' (connected to pulse height analyzer 29'), and scaler 30''', and, if desired, even more such channels. Such multiple channel units are adapted for the independent measurement of the activity levels of two or more isotopes which are simultaneously present in a single source or sample, or which are present individually in mixed sources or samples, and circuits and techniques for such detection and measurement are described, for example, in Packard U.S. Pat. No. 3,114,835, patented Dec. 17, 1963.

Very briefly, in multiple channel radioactivity detecting and measuring spectrometers, the output from photomultiplier 24'' is fed simultaneously to a plurality of channels, each containing an attenuation unit, an amplifier, a pulse height analyzer, and associated logic and scaler apparatus. In each channel the attenuation unit and/or amplifier amplify the pulse by an amount or factor which is different from that in the other channel or channels. Depending on whether the spectral peaks of the respective radionuclides are sufficiently separable to permit counting and monitoring of pulses from one radionuclide independent of pulses contributed by the other or others, or whether the spectral peaks sufficiently overlap as to require computation to determine the activity attributed to each radionuclide, multiple channel circuits are capable of simultaneously measuring the activity levels of each of several different radionuclides provided each radionuclide has a different characteristic energy spectrum.

d. Summation-Type Measurement Circuit

Figure 3:
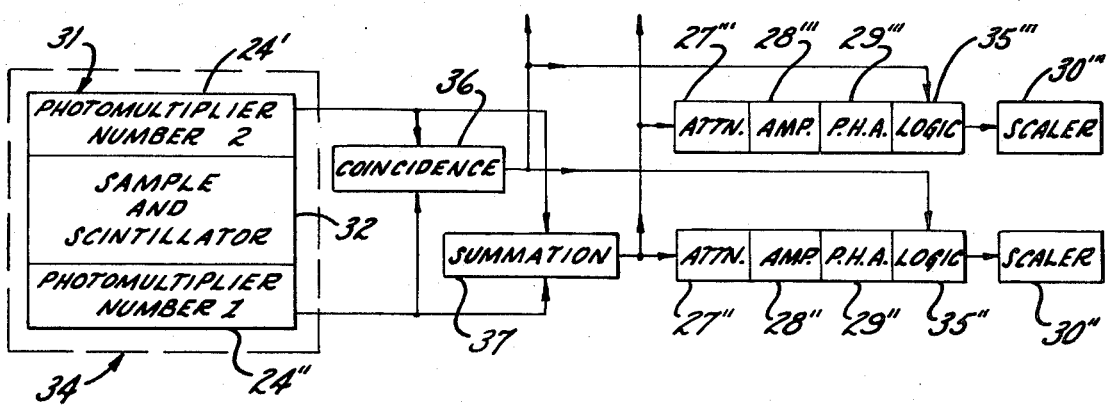
FIG. 3 is a diagrammatic block-and-line representation of a conventional coincidence type liquid scintillation spectrometer utilizing coincidence counting circuitry to enhance the performance of the spectrometer.

In a circuit of the type shown in FIG. 2 only one of the photomultipliers, 24'', is used for detecting scintillations corresponding to decay events occurring in the sample and scintillation medium 32; the other photomultiplier 24' serves only to exclude signals from the first photomultiplier 24'' that do not correspond to a scintillation. A significantly more efficient coincident counting circuit, generally termed a summation-type circuit as shown in FIG. 3, allows both photomultipliers 24', 24'' to observe the sample and scintillation medium 32 and to deliver a usable output signal to the counting channels and scalers corresponding to each decay event. In effect, a summation-type circuit adds algebraically the simultaneous output pulses of the two photomultiplier tubes 24', 24'' so that the input to the attenuation units and amplifiers is double the amplitude that can be obtained with a circuit of the type shown in FIG. 2, described above.

Summation circuits have several advantages. First, because all of the light output of a sample that is received by the photomultipliers is used in generating output signals to the pulse height analysis channels, more efficient counting is accomplished. Second, since the electrical signal corresponding to each event is effectively doubled while the noise level is unaffected, the signal-to-noise ratio is improved by a factor of 1.4 so that the pulse height analysis window (which will be explained below) can be wider for higher counting efficiency. Third, there is apparently a closer approach to the observation of average light emission from a sample since each scintillation, irrespective of which portion of the sample it takes place, is observed from both sides by the respective photomultiplier tubes. Fourth, and perhaps of prime importance in the counting of samples containing two or more radionuclides (double-labeled and mixed samples), the spectral peak from each radionuclide is made narrower, with corresponding less overlap between the spectrum from each nuclide and thus less interference from other nuclides when counting a particular nuclide.

As shown in FIG. 3, the summation circuit utilizes photomultipliers 24', 24'' positioned to observe the sample and scintillator 32 as in the arrangement of FIG. 2. Again, preamplifiers may be used, and the assembly of sample, photomultipliers, and preamplifiers may be positioned in a refrigerated zone, not shown. In contrast to the system of FIG. 2 however, the output pulses delivered by photomultipliers 24', 24'' are not fed to separate pulse height analysis channels, but rather are fed both to a coincidence circuit 36 and to a summation circuit 37. The coincidence circuit 36 may typically comprise an amplifier and a pulse forming network associated with each line from one of the photomultipliers, with the pulse forming networks feeding into an AND gate which delivers an output signal only when signals from the photomultipliers 24', 24'' are simultaneous. The summation circuit 37 illustratively comprises a pair of preamplifiers and a summing amplifier to sum the signal pulses received from the photomultipliers 24', 24''; thus, coincident pulses from the photomultiplier are effectively doubled in amplitude by the summation circuit 37 while non-coincident pulses corresponding to thermal noise in one of the photomultipliers remain at the initial level.

Further in the circuit of FIG. 3, the output signals from the summation unit 37 are fed to pulse height analysis channels, of which two such channels are shown in the drawing. Each such channel comprises an attenuation unit or control 27'', 27''', an amplifier 28'', 28''', a pulse height analyzer 29'', 29''', a logic circuit 35'', 35''', and a scaler 30'', 30'''. Thus, all of the pulses from summation unit 37 are received by each pulse height analysis channel, although the only pulses transmitted to the corresponding scaler will be those coincident pulses of proper amplitude such that they pass through the window established by the pulse height analyzer 29'', 29''' for that pulse height analysis channel.

Coincidence counting, that is, the rejection of non-coincident pulses caused by thermal noise in the photomultipliers or in their associated preamplifiers, is obtained by feeding the output from the coincidence circuit 36 to a logic circuit 35'', 35''' associated with each pulse height analysis channel. Thus, only those signals from photomultipliers 24', 24'' which are generated simultaneously will open the AND gate in the logic circuit 35'' and permit registration of the signal from the summation circuit 37 by the corresponding scaler 30'', 30'''.

As indicated in FIG. 3, two or more pulse height analysis channels may be utilized to count simultaneously a sample containing two or more radionuclides, the method of using the summation-type circuit of FIG. 3 corresponding generally to that described earlier in connection with the non-summation type circuit of FIG. 2, and as more fully set forth in the Packard U.S. Pat. No. 3,114,835. It will be appreciated that both circuits can be used to detect and measure the radioactivity in a sample containing a plurality of radionuclides, although the summation-type circuit of FIG. 3 has certain advantages, particularly with respect to improving the counting efficiency and to sharpening the resolution between spectral peaks corresponding to each of several radionuclides.

e. Typical Photomultiplier Arrangement

The structure and operation of typical photomultipliers and their associated circuitry have been fully described in the literature, as for example in the Packard U.S. Pat. No. 3,114,835, and accordingly their principles are well understood to those familiar with the electronic and photoelectronic arts. However, to provide a background for an understanding of the improved photomultiplier circuitry constituting a feature of the present invention, a brief description of photomultipliers and their operation will be presented. Attention is therefore directed momentarily to FIG. 9, which shows the improved photomultiplier circuit but which is, in other respects, sufficiently general to provide a basis for an overall discussion of photomultipliers.

In FIG. 9, one of the photomultipliers 24' (FIG. 2, 3, and 8) is shown in diagrammatic illustration. The photomultiplier 24' includes a generally cylindrical, opaque envelope 39 having a light transmissive end wall 40 disposed in proximity to the sample and scintillator (32 in FIGS. 2 and 3). Photosensitive cathode 41 is provided in the photomultiplier 24' in proximity to the light transmissive end wall 40. Each photomultiplier 24' also includes a plurality of dynodes D1 through D13, inclusive, which are held at progressively higher potentials relative to their corresponding cathode. To accomplish this, the cathode and dynode potentials are derived from a voltage divider circuit or network interconnecting the dynodes, including resistances R1 through R13 in series with the dynodes (except for dynode D3, as to which a description thereof will be reserved for a subsequent discussion), and resistance R14 connecting the voltage divider network to the first high voltage dc input 42, illustratively adjustable between 1,530 and 2,450 volts dc. A series of shunting capacitors C1 through C4 and C5, is in parallel with resistances R1 through R4 and R14, respectively. Capacitance C6 is connected from the high voltage dc source 42 to ground. To provide adjustment of the high voltage dc source 42, the voltage divider network is connected into an adjustable switch arm, not shown, adapted to engage a selected terminal of the high voltage dc power source (44 in FIG. 8).

In the particular circuit of FIG. 9 a second high voltage dc source 45, illustratively adjustable between 530 and 1,450 volts dc, is connected into the voltage divider network at dynode D10, and a low voltage dc source 46, illustratively of 170 volts dc, is connected to dynode D1. The second high voltage source 45, in combination with the first high voltage source 42, provides an extremely high gain for photomultiplier 24' so that it is unnecessary to provide for preamplification of the signal from the photomultiplier tube. The low voltage dc source 42 maintains a relatively high potential between the cathode 41 and the first dynode D1 independently of the high voltage outputs and has been found to minimize the effect of noise due to random fluctuations that occur in the electron multiplication process.

By way of example, values of resistances and capacitors employed in the circuit of FIG. 9 are presented in a table below.

TABLE I

EXEMPLARY VALUES OF PHOTOMULTIPLIER TUBE CIRCUIT COMPONENTS

| Resistances | | Capacitances | |
| --- | --- | --- | --- |
| R1 | 1.47M | C1 | 360PF |
| R2 | 1 M | C2 | 360PF |
| R3 | 750 K | C3 | 360PF |
| R4 | 499 K | C4 | 0.005 mf, 3KV |
| R5 | 499 K | C5 | 360PF |
| R6 | 499 K | C6 | 0.005 mf, 3KV |
| R7 | 499 K | | |
| R8 | 499 K | | |
| R9 | 499 K | | |
| R10 | 750 K | | |
| R11 | 750 K | | |
| R12 | 499 K | | |
| R13 | 750 K | | |
| R14 | 1.47M | | |
| R15 | 2.49K | | |
| R16 | 3 M | | |
| R17 | 10 M | | |
| R18 | 3 M | | |
| R19 | 1 M | | |
| R20 | 0.221M | | |

In the operation of a photomultiplier 24' as a scintillation detector, the voltage drop across resistance R13 is applied between the photosensitive cathode 41 and the first dynode D1, while the voltage drop across resistance R12 is applied between dynodes D1 and D2. The voltage drop across succeeding resistance is in turn applied between each succeeding pair of dynodes (reserving momentarily a discussion of the voltage drop from dynode D2 to D3 and that from D3 to D4). The arrangement is such that when a decay event, for example, a beta emission from a radionuclide, occurs in the sample (32 of FIGS. 2, 3, and 8) it produces a light scintillation which is simultaneously detected by each photosensitive cathode, e.g., 41, in its respective photomultiplier tube, e.g., 24'. As the light rays impinge upon the photosensitive cathode, electrons proportional in number to the energy of the light are emitted. The emitted electrons are attracted to the first dynode D1, which is at a higher voltage with respect to cathode 41, thus producing by bombardment still more electrons which are in turn attracted to the next higher potential dynode D2. This process continues until the electrons reach the anode 48 and thus cause current flow through, and voltage pulses across, load resistance R15. These voltage pulses are sent to an output transformer 49 and appear at the input to the attenuation units and/or amplifiers of FIG. 2 or FIG. 3.

The total gain produced by the photomultiplier tube 24' can be varied in several ways. Conventionally, the magnitude of the high voltage from sources 42 and/or 45 can be varied, e.g., by selecting an alternative terminal on the high voltage power supply (44 of FIG. 8), or by incorporating a potentiometer or other attenuator in the high voltage input circuit. Alternatively, a potentiometer or attenuator may be incorporated into the output from anode 48. When the photomultiplier tube 24' is used in conjunction with a preamplifier, the gain of the photomultiplier-preamplifier pair may be changed by varying the preamplifier gain.

In order to simplify the ensuing discussion, isotope decay events will herein be referred to by way of example as beta decay events or beta emissions. It will be understood, however, that alpha and gamma radiation may be considered in the same way, even though, particularly in the case of gamma radiation, there may be mono-energetic spectra involved in some instances.

f. Spectral Distributions and Optimum Counting Conditions

It is well known that beta-emitting isotopes produce decay events which individually involve energies spread over a fairly wide range or spectrum. Each isotope has its own characteristic spectrum with a known maximum energy. A small proportion of the decay events have relatively high and low energies, while the majority have energies in the middle region between the upper and lower limits, the distribution being skewed rather markedly toward the lower limit. For a given gain of the transducer which forms a source of voltage or current pulses proportionally related to the energies of the decay events, the amplitude spectrum of the pulses corresponds to the energy spectrum of the decay events.

Figure 4:
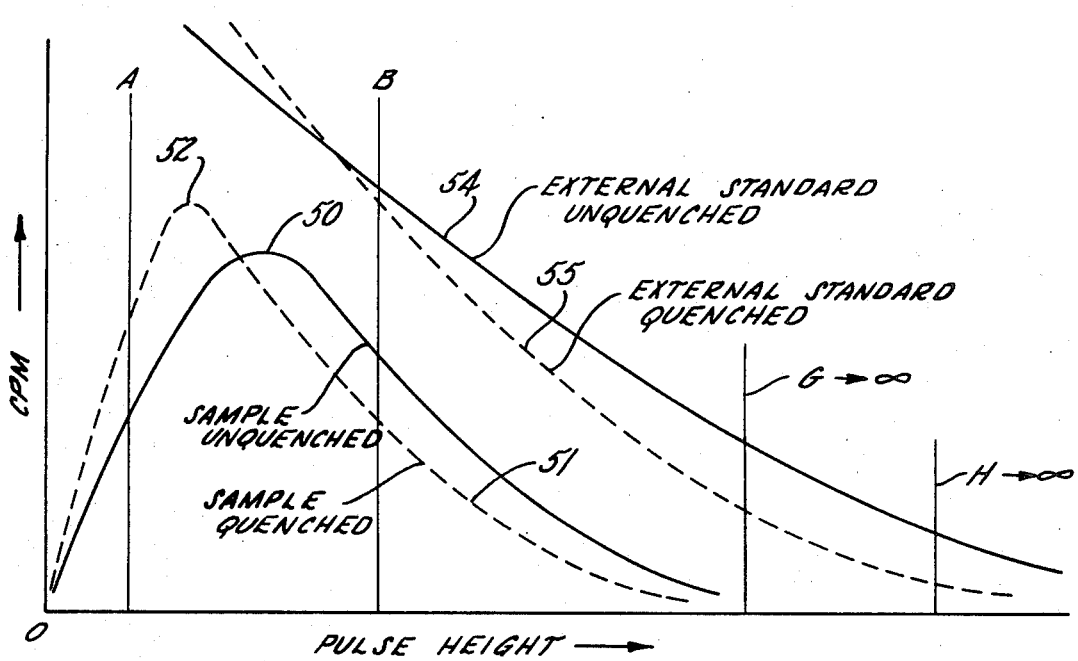
FIG. 4 is a graphic representation of an exemplary spectral curve for a given beta emitting radionuclide or isotope in a sample, together with the apparent spectral curve produced by an external gamma-emitting radionuclide, in each case showing the shift or displacement of the curve due to quenching of the sample.

Referring to FIG. 4 and to the solid curve marked "Sample, Unquenched", there is graphically illustrated a curve characteristic of the pulse height spectrum of a typical beta emitting isotope or radionuclide, the curve representing the distribution of voltage pulse heights (either at the output of a photomultiplier tube or subsequently in the amplification circuits). Thus, for purposes of discussion, the abscissa of the graph shown in FIG. 4 may be considered as volts as a measure of pulse height, while the ordinate is expressed in counts per unit time, or counts per minute (c.p.m.). For an actual curve, the numerical values of pulse height would depend upon the gain settings of the photomultiplier and/or subsequent amplification stages (e.g., in FIGS. 2 or 3), while the counts per minute scale would depend on the activity level of the sample. Thus, as is conventional, the area under the curve of FIG. 4 marked "Sample, Unquenched" is considered to have a unit integral, while any other curve drawn on the same chart, unless otherwise noted, would likewise be drawn to a scale such that its area under the curve would be equal to that of the unit curve.

In the following discussion it is assumed, except as otherwise stated for explanatory or elaborational purposes, that the sample contains only a single radionuclide species. For a parallel discussion involving multiple-labeled samples, reference can be made to the Packard U.S. Pat. No. 3,114,835.

Referring once again to FIG. 4, if there were no spurious counts caused by thermal noise or background radiation, and if there were no quench effects (to be described presently), detecting all of the counts from a sample over a predetermined time period would provide a reading of sample activity in absolute units of counts per unit time. In practice however this is infeasible for a number of reasons, most important of which is the presence of low level background noise and high level background radiation, both of which generate spurious pulses that are indistinguishable from the actual decay-produced pulses, particularly at low and high levels of pulse height.

The effects of high and low level noise are customarily minimized by employing amplitude discriminators as pulse height analyzers to reject all pulses below a predetermined minimum amplitude and all pulses above a second, higher, predetermined amplitude. Thus, in FIG. 4, amplitude discriminators in the pulse height analyzers (e.g., 29'', 29''' in FIG. 2), reject all pulses having an amplitude below A and all pulses having an amplitude over B. The region between A and B is termed the window, and it will be evident that the width of the window determines the fraction of the total spectrum that is counted by the radiation detecting and measuring apparatus.

A given spectrometer may G or provided with two or more windows, particularly when used for counting and measuring multiple-tagged samples. Additionally, and for reasons which will appear below, the spectrometer may have one or more integral or infinity channels, that is, amplification channels such as those indicated by G-to-infinity and H-to-infinity on FIG. 4, where the effective window is from a predetermined minimum amplitude G or H, respectively, and all pulses above that level are transmitted. Such integral windows are especially valuable in connection with the use of external standards to compensate for quenching effects.

Figure 6:
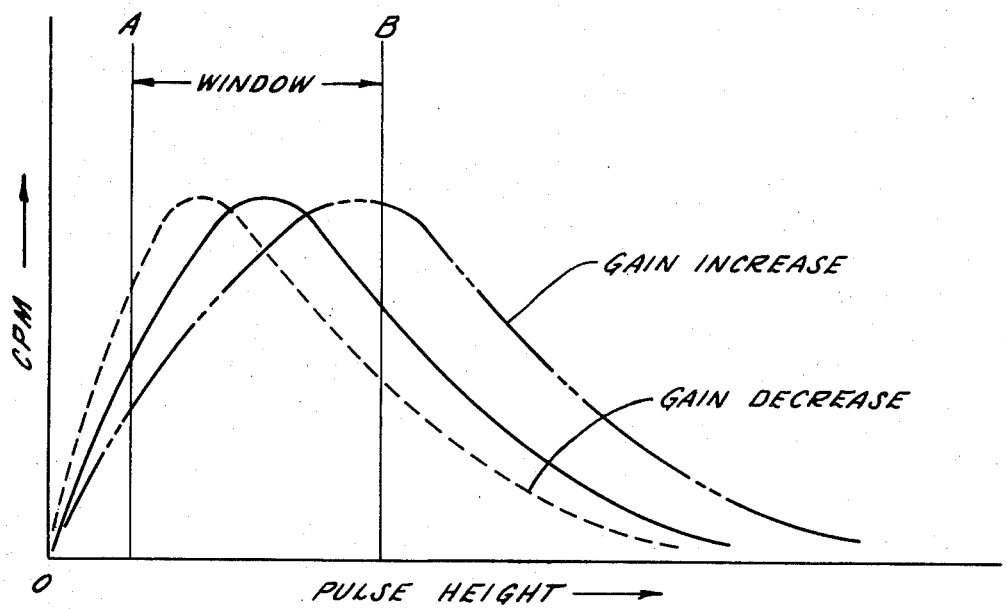
FIG. 6 is a graphic representation of a typical pulse height spectrum characteristic of a beta emitting radionuclide and illustrating the shift or displacement of the curve as a result of photomultiplier tube gain increase or decrease, and further illustrating the effect of such shift on the relative number of counts passing through the A-B discriminator window.

When working with low-activity radioactive sources or samples, and when background counts are appreciable, it is desirable to operate a spectrometer at or near optimum counting conditions, which serve to exclude a large proportion of background counts and to effectively eliminate apparent spectral shifts caused by variations in system gain (as described in conjunction with FIG. 6 below). Such optimum conditions exist when the pulse height analyzer is adjusted so that the efficiency of counting is high and the background counts are low, and more particularly when the ratio $E^2/B$ is near a maximum. This means that the window A–B (FIG. 4) of the pulse height analyzer should be wide, yet not so wide that background pulses included in the window become great in number compared to the number of pulses originating from the isotope. Moreover, the window should embrace the peak portion of the pulse height spectrum (of a beta-emitting radionuclide) in order to make the efficiency as high as possible for a given window width.

A second part of optimum counting conditions is termed balance point operation, more fully described in the Packard U.S. Pat. No. 3,114,835. In effect, the center of the selected window A–B is adjusted to coincide approximately with the peak of the spectrum 50 so that lateral shifts in the spectral curve (as will be described in connection with FIG. 6) do not appreciably affect the fraction of the total spectrum included within window A–B. Otherwise stated, where the spectral peak 50 is centered within the window A–B, lateral displacement of the curve in either direction has a minimum effect on the integral between the limits A and B.

g. Quenching and Quenching Compensation

As suggested by the discussion of a counting window, the counts per minute indicated by a scaler (e.g., scaler 30'', 30''' of FIG. 2) will be substantially less than the activity of the sample expressed as disintegrations per minute. The proportionality factor relating sample activity (in disintegrations per minute) to the measured counts per minute is termed the counting efficiency, and is invariably less than 100 percent. Counting efficiencies of less than 100 percent are due chiefly to three factors: limitations of equipment, the deliberate exclusion of a portion of the count by adopting the window technique, and quench.

This last element, quench or quenching, is chiefly of two types. Chemical quenching results from the presence of ingredients in the sample and scintillator (32 of FIG. 2) which interfere with the conversion of beta particles to light scintillations; organic compounds having a nitro group and particularly serious offenders in this respect. Color quenching is the attenuation or diminution of the brightness of a scintillation caused by colored or color-absorbing ingredients in the sample and scintillator.

The effect of either type of quenching is identical, and results in an apparent diminution of pulse height as measured by a photomultiplier or as transmitted through a pulse height analysis channel. In terms of spectral shift, the broken line 51 of FIG. 4 illustrates the displacement of a spectrum caused by quenching, and it will be observed that the new peak 52 is displaced to the left of the former peak 50. In keeping with the conventional maintenance of constant area under the spectral curves, the new peak 52 is shown higher than the old peak 50, although it will be appreciated that, for a given sample, there is no change in disintegrations per minute as a result of quenching; the only change is an apparent diminution of measured counts per minute.

Systems and techniques have been devised for compensating for quench effects, and as will be explained subsequently, the inventive technique of normalization disclosed herein is of particular utility in connection with certain types of quench compensation apparatus and procedures.

1. Internal Standard

Perhaps the earliest technique of quench compensation is by the use of an internal standard, that is, the procedure of determining the activity of a sample in a scintillator, adding a known quantity of a known standard, re-determining the activity, and computing the unquenched activity of the original sample from the ratio of the difference in the two measurements and the expected difference based on the known activity of the standard.

By way of example, assume that a test sample is placed in the spectrometer and records an activity of 50,000 counts in 1 minute (50,000 c.p.m.). Obviously the 50,000 counts are not truly indicative of the number of decay events that occurred in one minute, since some counts are not recorded due to instrument limitations, others because they fall below the detection threshold, still others because they are outside the window, and finally others because of quenching. Consequently, a spectrometer will always operate at below 100 percent efficiency.

Assuming that there is no quenching, it is relatively easy to determine the efficiency. This could, for example, be done by first inserting a standard into the counting chamber which is known to undergo, say, 100,000 decay events per minute. If a standard is then counted and records 50,000 counts in one minute, the machine is operating at 50 percent efficiency. Therefore, if it were not for quenching, the 50,000 counts per minute recorded from the test sample is representative of an isotope having an activity level of 100,000 counts per minute.

If the sample is quenched however an additional compensation must be made because the quenching will reduce the counting efficiency to a level below 50 percent. In the technique known as internal standardization, once the count for the unknown test sample is recorded at, say, 50,000 counts per minute, the technician adds a known amount of the same radionuclide to the sample, assuming, in this case, one having an activity of 50,000 disintegrations per minute. The sample (with added standard) is then recounted. Had the sample been unquenched, and knowing the efficiency of the machine is 50 percent, it would be anticipated that the addition of 50,000 disintegrations per minute into the sample should produce 25,000 additional counts in the second counting operation. In other words, the second counting operation should produce 75,000 counts, of which 50,000 are contributed by the radionuclide originally present in the sample and the other 25,000 are contributed by the known standard. However, if there is quenching present, the second count will be less than 75,000. It may, for example, be 62,500. Thus, the technician will know that he has lost an additional 25 percent of the pulses because of quenching and he may therefore determine arithmetically the true activity level of the sample.

2. External Standard--Straight Count

The technique of internal standardization is rather cumbersome and laborious; it is slow, the original sample is invariably contaminated by the standard, there is opportunity for technician error, and frequently different standards must be used with different samples where the samples have widely differing activities. To avoid these limitations, the technique of external standardization has been developed, and for a complete description of one type of external standardization reference may be made to Packard U.S. Pat. No. 3,188,468, issued June 8, 1965.

Briefly, for external standardization, a sample is first counted alone, a high energy gamma-emitting source is placed near the sample, and the two re-counted together. By relating the actual change in measured counts to the expected change produced by the external standard (as determined by previously counting the external standard in the presence of an unquenched standard), the un-quenched activity of the sample can then be computed.

Some of the above concepts will become more clear by referring again to FIG. 4. It is there seen that curve 54, marked "External Standard, Unquenched", and produced by Compton interaction of the gamma rays from the external standard with the material in the sample and scintillator, is shifted to the position indicated diagrammatically by broken curve 55 as a result of quenching. This shift is much the same as the shift of the "Sample, Unquenched" shift to the new curve "Sample, Quenched" 51 produced by quenching. Thus, by one simple technique, known as the straight count method, determining the change in counts produced only by the external standard at any predetermined window or infinity channel (e.g., the G-to-infinity channel) it is possible to compute the effect of quenching on the sample itself.

Figure 5:
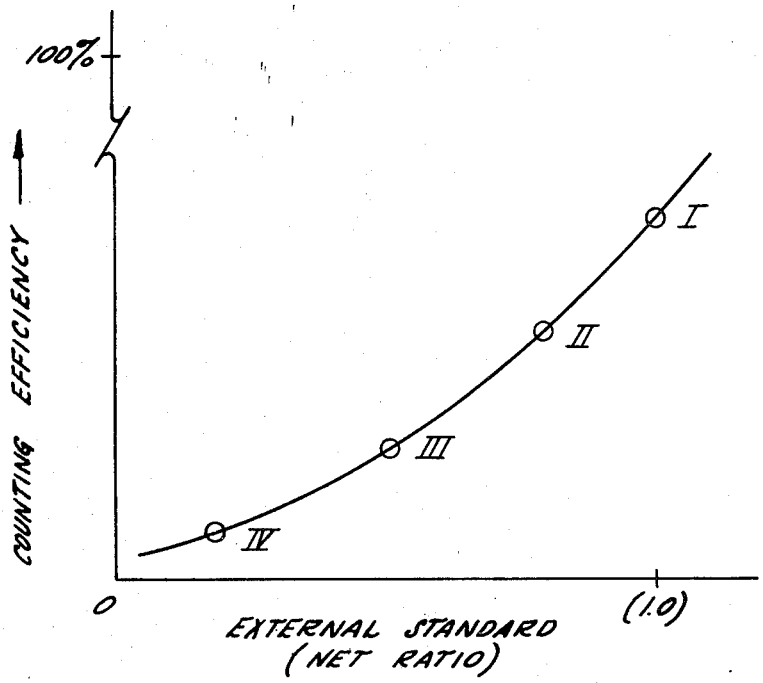
FIG. 5 is a typical quench correlation curve used in connection with an external standard to compensate automatically for sample quenching.

In somewhat more detail, the straight count method can be illustrated with reference to FIG. 5. Ignoring momentarily the information on FIG. 5 included within parentheses, the figure depicts a calibration curve for an external standard and a sample of known activity as a function of the degree of quenching. To prepare a curve such as that of FIG. 5 a series of samples having the same known activity is made up, respectively samples I, II, III, IV, the latter three containing progressively increased amounts of an ingredient known to produce quenching. Advantageously, these samples contain the same scintillator, solvent, and radionuclide as the "unknown" samples. These samples are then counted in the presence of the external standard and a curve such as that of FIG. 5 plotted. Then, using the same channel or channels that were employed in preparing FIG. 5 to count the pulses produced by the external standard in the presence of an unknown sample, the plot of FIG. 5 immediately yields a numerical value for the counting efficiency. When this efficiency is divided into the measured activity of the unknown sample counted in the absence of the external standard, the quotient is the true activity of the sample in disintegrations per minute.

3. Net External Standard Ratio

A further improvement of the technique of external standardization entails the use of two channels, rather than one, to determine the amount of quenching of radiation produced by the external standard. This technique, known as the net external standard ratio procedure, is particularly adaptable to the automatizing of external standard quench determinations.

Again inviting attention to FIG. 4, the selected channels for determining quenching effects of radiation from the external standard are selected at two levels, preferably each above the maximum activity level of any beta-emitting radionuclide in the sample. Thus, as illustrated in the figure, one channel is H-to-infinity while the other channel is G-to-infinity. For practical purposes, it is preferable that the total number of counts produced by the external standard on an unquenched blank be in the ratio of 2:1 from the G-to-infinity channel and the H-to-infinity channel. Otherwise stated, with an external standard and an unquenched blank, the G-to-infinity channel will record twice as many counts as will the H-to-infinity channel.

As will be apparent from FIG. 4, as quenching occurs the "External Standard, Unquenched" curve originally at 54 will be displaced to the new position 55 marked "External Standard, Quenched". Moreover, the ratio of counts received by each of the two infinity channels will no longer be the same. This change of ratio provides a versatile procedure for compensating against the effects of quenching.

Adverting attention again to FIG. 5, but this time including the information within parentheses, the same type of calibration curve may be used as was employed in the straight count method. For convenience however, it is preferable that the ratio of the counts through the G-to-infinity and the H-to-infinity channels be converted by an arbitrary factor to unity, so that a change in the ratios provides an immediate quantitative indication of the degree of quenching. Also, it is usually more convenient to employ the ratio of H-to-infinity to G-to-infinity, rather than vice versa.

Suitable circuitry for utilizing the net external standard ratio technique has been described elsewhere, as for example in Robert E. Cavanaugh, Jr. Application Ser. No. 541,721, filed Apr. 11, 1966, and accordingly only a brief description thereof as it applies to the present invention is here furnished. Turning to FIG. 8, an exemplary external standardization circuit, shown schematically as circuit 56, is therein depicted in combination with a summation type coincidence counting circuit which also employs normalization according to the present invention. The normalization feature is best reserved for later discussion, but in all other significant respects the system of FIG. 8 corresponds to the summation-type coincidence circuit system previously described in connection with FIG. 3, except for the addition of external standardization and of an additional pulse height analysis channel (attenuation unit $27^{iv}$, amplifier $28^{iv}$, pulse height analyzer $29^{iv}$, and logic unit $35^{iv}$). The various logic units $35''$, $35'''$, and $35^{iv}$ feed into a control logic, scaler, computer, and readout system shown schematically as block 58. This system of block 58 also controls the operation of the automatic external standard placement mechanism, or in-out control 59, adapted to position the external standard near the sample during a preselected period, e.g., 0.5 minutes, of automatic external standard counting in conjunction with the spectrometric analysis of each sample. The apparatus for effecting automatic external standardization in-out control, schematically shown as 59 in FIG. 8, is more fully exemplified in Packard U.S. Pat. No. 3,188,468.

As shown in FIG. 8, all pulses received by either or both photomultipliers 24' and 24'' are summed in summation circuit 37 and are fed to the three pulse height analysis channels as well as to the external standardization system 56. The pulse height analysis channels were described previously in connection with FIG. 3 and no further description is warranted.

External standardization system 56 is comprised of an amplifier 61, a 1:2 attenuation circuit 62, and a pair of discriminators, H-to-infinity discriminator 64 and G-to-infinity discriminator 65, the latter two being in parallel relationship. These discriminators respectively pass pulses of heights corresponding to the H-to-infinity and the G-to-infinity channels shown in FIG. 4. Additionally, the H-to-infinity discriminator (or pulse height analyzer) 64 is made adjustable so that it will pass exactly half as many counts (from the external standard irradiating an unquenched blank) as will the G-to-infinity discriminator 65. Further, to accommodate a more conveniently usable number of pulses, the H-to-infinity discriminator 64 is followed by a frequency divider 66 which divides the output pulses from H-to-infinity discriminator 64 by a factor of two, and the G-to-infinity discriminator 65 is followed by a frequency divider 68 which effects a division by four. Thus, inasmuch as pulses from the G-to-infinity discriminator 65 are divided by a factor twice as great as the pulses from H-to-infinity discriminator 64, both discriminators will ultimately deliver the same number of counts to the control logic, scaler, computer, and readout system 58 (with the external standard irradiating an unquenched standard).

h. Effect of Amplification Gain Change

Although the system as described above is capable, both in theory and in practice, of accurately detecting and measuring radioactivity when all components are functioning properly, the qualification that all components are so functioning is an important condition that is not infrequently violated. While the electronic components currently available possess unusual stability, this stability is not shared by the photomultipliers. As indicated previously, photomultipliers exhibit an increase in amplification gain that can be quite marked at the outset and, even after extended use, can depart from their normal, or specified, gain characteristics. Moreover, such departure may reduce or eliminate many of the benefits from coincident counting, summation-type circuitry, and external standardization.

Figure 7:
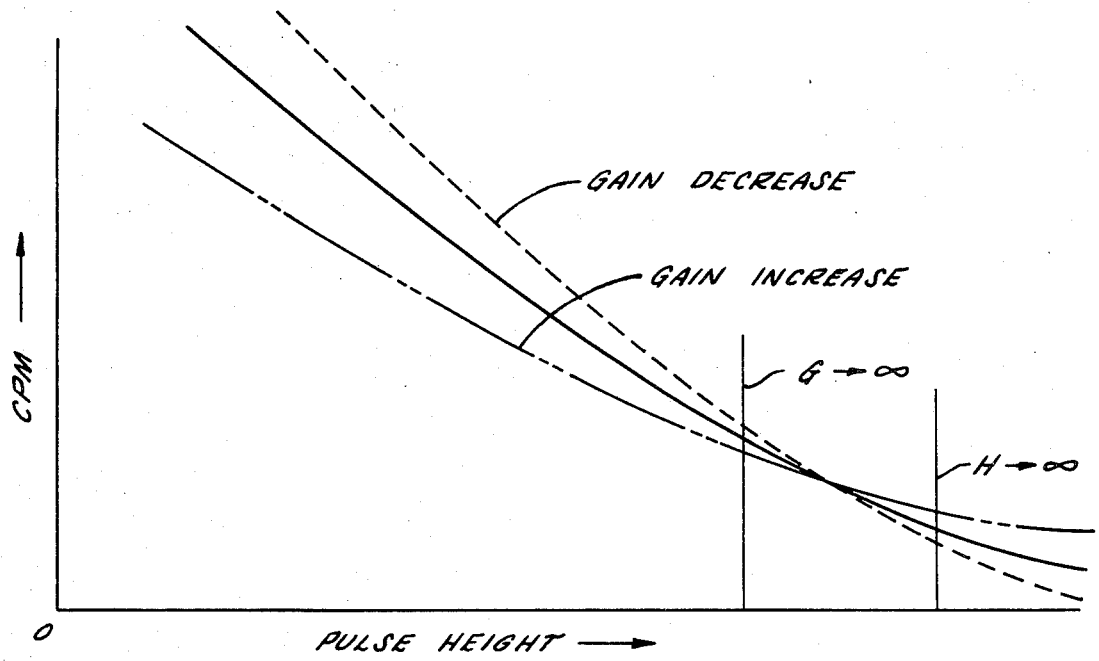
FIG. 7 is a graph similar to that of FIG. 6 but illustrating the effect on an external standardization curve of photomultiplier tube gain increase and decrease.

This may be illustrated with reference to FIGS. 6 and 7, respectively showing (in solid lines) the spectral curve for a given beta-emitting isotope and the effective spectral curve from an external standard. Both figures show, in broken lines designated as "Gain Increase", the shift or displacement of the respective curves as photomultiplier tube gain increases, and in dotted lines marked "Gain Decrease" the curve shifts as the gain decreases. Although the magnitude of these shifts has been exagerated for illustrative purposes, it is readily apparent that a shift in the spectral curve caused by gain increase or decrease can radically affect the counting efficiency even with balance point operation by displacing the spectral curve with respect to the A-B window. Also, and as shown in FIG. 7, an increase or decrease in photomultiplier tube gain can—and does—profoundly affect the sensitive H-to-infinity:G-to-infinity ratio employed with the net external standard ratio method using external standardization.

To state the matter another way, even the most ingenious apparatus and the most careful techniques can be frustrated by a change in gain of either or both of the photomultipliers.

NORMALIZATION ACCORDING TO THE INVENTION

The system of the invention provides an apparatus and method for restoring the photomultiplier tube or tubes to a predetermined normal, or standardized, operating characteristic. While not so limited in its application, the invention has particular applicability to spectrometers using coincidence counting, summation-type circuitry, and/or external standardization, where it permits the full benefits of these procedures to be realized.

In brief over-view, normalization permits the gain of a photomultiplier to be adjusted, and therefore returned to a predetermined normal condition, without necessarily altering the high voltage power input to the photomultipliers. It permits the photomultiplier or photomultipliers to be maintained at a constant gain level irrespective of the tendency of such gain to change with time. Thus, the distortion in counting efficiency described in connection with FIG. 6 and the distortion in external standardization as discussed in connection with FIG. 7, among other things, may be substantially eliminated.

Optimally, normalization according to the invention is used in combination with a spectrometer having dual channel coincidence counting, summation-type circuitry, and automatic external standardization. Accordingly, one such system is exemplified by the circuit of FIG. 8, much of which has been described previously.

By way of recapitulation, the number 1 and number 2 photomultipliers, shown respectively as 24" and 24', observe the sample and scintillator 32, which is emitting light scintillations in response to the decay of a radionuclide in the sample. Each photomultiplier is supplied with a high voltage from high voltage source 44, and as a result of the functioning of the dynodes (FIG. 9) in each respective photomultiplier, the photomultipliers deliver output pulses proportional to the intensity of light observed by each photomultiplier. These output pulses are simultaneously fed to a coincidence or logic circuit 36, which gates the individual logic circuits 35", 35''', 35$^{iv}$ in the respective pulse height analysis channels.

Output pulses from the photomultipliers 24', 24" are also fed to the summation circuit 37, which algebraically sums the pulses from the photomultipliers and delivers its output pulses to (1) the several pulse height analysis channels, each composed of an attenuation unit, an amplifier, a pulse height analyzer, and a logic circuit, and (2) the external standardization circuit 56. Thus, in the circuit depicted in FIG. 8, each of the pulse height analysis channels and the external standardization circuit 56 are at all times supplied with voltage pulses from the summation circuit 37. The control logic, scaler, computer and readout system 58 determines which of the various channels will be connected in circuit to the readout system using principles that form no part of the present invention. Additionally, the system 58 is advantageously provided with a computer for determining and printing out the ratio of the external standardization circuit 56, that is, twice the ratio of output pulses from H-to-infinity discriminators 64 (less deduction for background noise) to the output of G-to-infinity discriminator 65 (again less a deduction for background noise). This ratio, as explained earlier, will be unity for an unquenched sample.

Considering normalization only from a functional standpoint and deferring momentarily the manner in which it is accomplished, let it be assumed that some means are available for adjusting the gain of photomultiplier tubes 24', 24", and let it further be assumed that at the time in question one or both of the photomultipliers has a higher gain than that intended. It will be evident, from a consideration of FIG. 7, that the apparent spectral curve will follow the broken "Gain Increase" curve rather than the proper unbroken curve that would be expected when counting an external standard and an unquenched standard. Further, the pulse ratio from the external standardization circuit 56 will be greater than unity because the H-to-infinity channel will be receiving more than half as many pulses as are counted through the G-to-infinity channel.

Additionally, it will also be apparent that the shift of the curve in FIG. 7 will be dependent on gain increases of each photomultiplier tube 24', 24" for the reason that the amplifier 61 in the external standardization circuit 56 is fed pulses from the summation circuit 37 that represent the sum of the pulses from each photomultiplier.

In the schematic circuit of FIG. 8, a normalization circuit 70 is provided which, in a manner to be discussed below, is capable of altering the gain of each photomultiplier 24', 24" (or associated circuitry) independent of the other photomultiplier. This normalization circuit 70 is associated with a shunt switch 71 around the 1:2 attenuation unit 52 in the external standardization circuit 56 so that when one of the photomultipliers is rendered inactive, pulses from the other, active, photomultiplier will not be attenuated in the external standardization circuit 56 and will accordingly have the same amplitude as would the summed pulses from both photomultipliers 24', 24" with the attenuation circuit 52 in operation.

Still considering normalization only from a functional standpoint, it is possible, with the circuit of FIG. 8, to determine whether each photomultiplier is functioning normally or whether it has experienced a gain increase or decrease. To this end, the external standard gamma emitter is inserted near an unquenched standard (containing a scintillator but having no activity). Then with one of the photomultipliers deactivated and with the 1:2 attenuation circuit 62 shorted out, the spectrum will correspond to that shown in FIG. 7: the solid line if the active photomultiplier has a normal gain, the dashed line if it has experienced a gain increase, and the dotted line if there has been a gain decrease. The gain increase or decrease will, moreover, be reflected as a change in the ratio of counts detected by the H-to-infinity discriminator and that detected by the G-to-infinity discriminator (after multiplying by the factor of two to maintain the expected ratio at unity). Thus, by regulating or adjusting the output of the photomultiplier tube undergoing normalization to establish a ratio as close as desired to unity, the photomultiplier will then have its gain restored to the desired gain represented by the solid line of FIG. 7.

By the same token, the same procedure is repeated with the opposite photomultiplier engaged in circuit and with the previously-normalized photomultiplier disengaged, and again the gain of the engaged photomultiplier is adjusted if necessary to restore the measured channels ratio to within a desired tolerance of 1.000. If the ratios obtained from each photomultiplier 24', 24" is within the acceptable tolerances after normalization, it can be concluded that the gain of each photomultiplier tube will be at its normal, or design, level and that both of the photomultiplier tubes have substantially equal gains, i.e., are in balance. Under these conditions, the net external standard ratio from external standardization unit 56 will be a function only of the degree of quench within the sample and scintillator (FIG. 4) and the position, and hence counting efficiency, of a spectral curve will not exhibit a change caused by system gain (FIG. 6).

Exemplary Normalization Circuit

An exemplary photomultiplier tube circuit according to the invention, having an adjustable current gain without necessarily adjusting the normally-constant high voltage input, is depicted schematically in FIG. 9, certain portions of which were discussed previously. Although, as earlier indicated, the high voltage input—actually inputs 42 and 45—may and conveniently are made adjustable in steps, the principal feature of the circuit of FIG. 9 is that the gain of the photomultiplier tube 24' can be adjusted independent of the high voltage power supply and independent of adjustments of the other photomultiplier.

Turning once again to FIG. 9, the photomultiplier tube 24' comprises an envelope containing a cathode 41, and anode 48, and a sequential array of dynodes D1 through D13, inclusive. The dynodes are connected through a voltage divider network including resistances R1 through R12 and resistances R14 and R13 so that each dynode is supplied with a progressively higher potential relative to the cathode, which in the present embodiment is shown grounded. Further, a first high voltage dc current is supplied from source 42 to dynode D13 via resistance R14, a second high voltage dc current is supplied to dynode D10, while a low voltage, 170 volts dc, is connected to dynode D1; maintaining this relatively high potential between the cathode and the first dynode independently of the high voltage output settings minimizes the effect of noise due to random fluctuations that occur in the electron multiplication process.

The only variable interdynode voltages are the potentials developed between dynodes D1 through D10, the potentials between dynodes D10 and D13 being maintained constant by maintaining a constant 1,000 volt difference between the first high voltage source 42 and the second high voltage source 45. Between each of dynodes D1 through D10 is a resistance sub-network where, preferably, an equal dc accelerating voltage may be applied to each interdynode stage.

An additional voltage divider network is provided between dynodes D2 and D4 composed of a pair of fixed resistances in series R10, R11, and a parallel circuit composed of the series resistances R18, R19, R20. Resistance R19 is an adjustable potentiometer. Thus, by adjustment of the slider 73 on potentiometer R19, the voltage between dynode D3 and its preceding dynode D2 (or, by difference, between D3 and its succeeding dynode D4) can be adjusted without affecting the voltage between the preceding dynode D2 and the succeeding dynode D4. By the same token, changing the voltage at dynode D3 does not affect the voltages at the other dynodes and changes the interdynode gain only between D2–D3 and between D3–D4. In other words, the gain at all other stages of the photomultiplier tube 24', and perforce in all stages of the corresponding photomultiplier tube 24" (FIG. 8) will be unaffected by adjustments of the voltage applied to dynode D3.

Inasmuch as a change in the potential between dynode D3 and D2 concurrently changes the potential between dynode D3 and D4 (by an amount equal to the difference between the potential across D4 and D2 less the potential between D3 and D2), a change in the potential applied to dynode D3 affects the gain in two interdynode stages, namely D2–D3 and D3–D4. The magnitude of each stage gain depends on the potential across D4 and D2 as well as the adjustment made in the potential between D3 and D2, and for a D4–D2 of 140 volts dc, the Table below illustrates the magnitude of dynode 4–2 stage gains that can be obtained. Thus, a comparatively broad gain adjustment in the photomultiplier tube 24 can be accomplished by adjusting the voltage applied to one of the dynodes.

TABLE II

DYNODE STAGE GAINS AS FUNCTION OF DYNODE VOLTAGE, FOR +140 V dc BETWEEN DYNODES 2 AND 4

| +140 V dc Distribution, Dynode 4–2 | | Approximate Dynode Stage Gain | | Total Gain, Dynode 4–2 |
|---|---|---|---|---|
| Dynode 2 to 3, V dc | Dynode 3 to 4, V dc | Dynode 2–3 | Dynode 3–4 | |
| 7 | 133 | 0.4 | 5.7 | 2.3 |
| 20 | 120 | 1.1 | 5.3 | 5.9 |
| 30 | 110 | 1.7 | 4.9 | 8.3 |
| 40 | 100 | 2.2 | 4.6 | 10.2 |

To disengage one of the photomultipliers while the other is being normalized as described previously, a system is provided that effectively eliminates the gain of that photomultiplier which is not being normalized. This, moreover, is preferably accomplished without disconnecting the high voltage inputs or the output of the disengaged photomultiplier tube. To this end, the low voltage dc from source 46 is passed through resistance R16 and is made available at terminal 72 of the switch 74. When the switch 74 is connected to terminal 72 a voltage is applied to the dynode D3 which is negative with respect to dynode D2. As a consequence, electrons normally attracted from D2 to D3 are repelled by the now-negative potential and consequently are substantially prevented from further passage through the photomultiplier tube 24'. As a result, when switch 74 is connected to terminal 72 the photomultiplier tube 24' is effectively producing no output pulses.

In similar manner, a corresponding circuit is provided for the opposed photomultiplier tube 24'' (FIG. 8). Thus, both tubes may be normalized without physically disconnecting or disengaging either the high voltage inputs or the output circuitry.

One final point: a pair of terminals 75, 76 is provided for switch 74 so that, when the switch is in engagement with either terminal 75 or 76, the position of wiper 73 on potentiometer R19 remains unaltered, and consequently the potential applied to dynode D3 is unchanged. Switch 74 may thus be ganged to a corresponding switch, not shown, in a corresponding circuit for the opposed photomultiplier 24'' (FIG. 8), and with the shunt 71 around attenuation unit 62 (FIG. 8). Thus, with switch 74 in engagement with terminal 75, both photomultipliers are operating and the system of FIG. 8 may be used for counting; with terminal 72 engaged by switch 74 the photomultiplier 24' is disengaged while the photomultiplier 24'' (FIG. 8) is being normalized. Similarly, with the switch 74 engaged with terminal 76, the photomultiplier 24' may be normalized while photomultiplier 24'' (FIG. 8) is disengaged.

Thus it is apparent that there has been provided, according to the invention, a method and means that fully satisfy the objects, aims, and advantages set forth earlier.

I claim as my invention:

1. A method of normalizing a spectrometer having (1) a pair of photomultiplier tube circuits responsive to scintillations from radioactivity decay events for producing electrical signals proportional in amplitude to the energy of corresponding decay events, each of said circuits comprising (a) a photomultiplier having an anode, a cathode, and a sequential array of dynodes, (b) a voltage divider network interconnecting said dynodes, and (c) means for applying a high voltage across said network to establish progressively higher potentials at said dynodes relative to the cathode, (2) means for amplifying the signals from said circuit, (3) discriminator means for passing only a selected amplitude band of amplified signals therethrough, and (4) means for counting discriminated amplified signals as a measure of the activity level of a radionuclide, the improvement comprising:

1. disposing a radionuclide near each of said photomultipliers, said radionuclide having predetermined count-producing characteristics,
   2. counting the counts produced by said radionuclide, and
   3. adjusting each of said voltage divider networks independent of one another and independent of said high voltage to thereby independently adjust the gain of each of said photomultiplier tube circuits to produce a count substantially equal to said predetermined count so that said spectrometer is thereby compensated for changes in gain characteristics of said photomultipliers with time.

2. A method of normalizing a scintillation spectrometer having (1) a pair of means responsive to radioactivity decay events for producing electrical signals proportional in amplitude to the energy of corresponding decay events (2) means for amplifying the signals from said event-responsive means, (3) discriminator means for passing only a selected amplitude band of amplified signals therethrough, (4) circuit means adapted to selectively respond to simultaneous signals of both said event-responsive means or to signals of one of said event-responsive means and for delivering an output signal, and (5) means for counting said output signals as a measure of the number of said decay events, which method comprises the steps of:

1. exposing a radionuclide having predetermined count-producing conditions to said event-responsive means, said radionuclide producing counts at said counting means, and
   2. adjusting the response of only one of said event-responsive means and then only the other of said event-responsive means to produce counts at said counting means substantially equal to said predetermined count wherein said adjustment of one of said event-responsive means is independent of the adjustment of said other event-responsive means.

3. A scintillation spectrometer comprising:
 1. a pair of means responsive to radioactivity decay events for producing electrical signals proportional in amplitude to the energy of corresponding decay events, each of said pair of radioactivity decay event-responsive means exhibiting changes in response characteristics with time,
 2. means for applying a voltage to each of said pair of event-responsive means,
 3. means for amplifying signals from each of said pair of event-responsive means,
 4. discriminator means for passing only a selected amplitude band of amplified signals therethrough,
 5. means for counting discriminated amplified signals as a measure of the number of said decay events,
 6. means for disposing near each of said pair of event-responsive means a radionuclide having predetermined count-producing characteristics, said radionuclide producing counts at said counting means, and
 7. means for adjusting each of said pair of radioactivity decay event-responsive means independent of one another and independent of the voltage applied to said event-responsive means to produce a count at said counting means substantially equal to said predetermined count.

4. Spectrometer of claim 3 including a plurality of discriminator means, one of said discriminator means being operative to produce counts when determining the activity level of an unknown sample and the other of said means being operative to produce counts when said radionuclide having predetermined count-producing characteristics is disposed near said event-responsive means.

5. Spectrometer of claim 3 wherein said radionuclide is a gamma-emitting nuclide.

6. A scintillation spectrometer having provisions for adjusting the gain characteristics to compensate for gain changes with respect to time comprising:
 1. a pair of photomultiplier tube circuits responsive to scintillations from radioactivity decay events for producing electrical signals proportional in amplitude to the energy of corresponding decay events, each of said circuits comprising
   a. a photomultiplier having an anode, a cathode, and a sequential array of dynodes,
   b. a voltage divider network interconnecting said dynodes, and
   c. means for applying a high voltage across said network to establish progressively higher potentials at said dynodes relative to the cathode,
 2. means for amplifying the signals from each of said circuits,
 3. discriminator means for passing only a selected amplitude band of amplified signals therethrough,
 4. means for counting discriminated amplified signals as a measure of the activity level of a radionuclide,
 5. means for disposing a radionuclide having predetermined count-producing characteristics near said photomultipliers, said radionuclide producing counts at said counting means, and
 6. means for adjusting each of the voltage divider networks independent of one another and independent of the high voltage applied across said networks to independently adjust the gain of said photomultiplier tube circuits and thereby produce a count at said counting means substantially equal to a predetermined normal count.

7. Spectrometer of claim 6 wherein said gain adjusting means includes means for adjusting the voltage applied to at least one of said dynodes without affecting the voltage between preceding and succeeding dynodes.

8. Spectrometer of claim 7 wherein said voltage dividing means comprises a potentiometer connecting said preceding and succeeding dynodes, with the potentiometer slider connected to said at least one of said dynodes.

9. Spectrometer of claim 7 including means for applying a biasing potential to said at least one dynode lower than that of the preceding dynode, whereby the gain of said photomultiplier is reduced to substantially 0.

10. A scintillation spectrometer comprising:
 1. a pair of photomultiplier tube means responsive to scintillations from radioactivity decay events for producing electrical signals proportional in amplitude to the energy of corresponding decay events,
 2. means for applying high voltage to each of said event-responsive means,
 3. means for applying the signals from each of said event-responsive means,
 4. discriminator means for passing only a selected amplitude band of amplified signals therethrough,
 5. circuit means adapted to selectively respond to simultaneous signals from both of said event-responsive means or to signals from one of said event-responsive means and for delivering an output signal,
 6. means for counting output signals from said circuit means as a measure of the number of decay events, and
 7. means operative when said circuit means responds to signals of only one of said event-responsive means for adjusting the response of said event-responsive means to produce a count at said counting means substantially equal to a predetermined count wherein said adjusting means adjusts the response of one of said event-responsive means independent of the response of the other event-responsive means and independent of said high voltage.

11. A scintillation spectrometer comprising:
 1. a pair of photomultiplier tube circuits responsive to scintillations from radioactivity decay events for producing electrical signals proportional in amplitude to the energy of corresponding decay events, each circuit comprising:
   a. a photomultiplier having an anode, a cathode, and a sequential array of dynodes,
   b. a voltage divider network interconnecting said dynodes, and
   c. means for applying a high voltage across said network to establish progressively higher potentials at said dynodes relative to the cathode, 2. means for amplifying the signals from said photomultiplier tube circuits,
3. discriminator means for passing only a selected amplitude band of amplified signals therethrough,
4. circuit means for selectively responding to simultaneous signals of both said photomultiplier tube circuits or to signals of one of said circuits and for delivering an output signal,
5. means for counting said output signals as a measure of the number of said decay events, and
6. means operative when said circuit means responds to signals of one of said photomultiplier tube circuits for adjusting said voltage divider network independent of said high voltage to thereby adjust the gain of said photomultiplier tube circuit to a predetermined normal gain independent of the gain of the other photomultiplier tube circuit.

12. Spectrometer of claim 11 including amplifying means and discriminator means associated with each of said photomultiplier tube circuits, and wherein said circuit means is subsequent to said amplifying and discriminator means.

13. Spectrometer of claim 11 including means for summing the signals from said photomultiplier tube circuits and for passing the summed signals to said amplifying means, and wherein said circuit means includes a simultaneous signal responsive means prior to said amplifying and discriminator means.

14. Spectrometer of claim 11 wherein said circuit means, when responsive to signals of one of said photomultiplier tube circuits, includes two discriminator means to pass selected amplitude bands, and wherein said counting means includes means for determining the ratio of signals passed through said bands as an indication of the gain of said photomultiplier tube circuits.

15. Spectrometer of claim 14 wherein said amplitude bands are integral channels.

16. Spectrometer of claim 11 wherein said gain adjusting means is independent of the high voltage applied to said photomultiplier.

17. Spectrometer of claim 11 including means for applying a biasing potential to one of said dynodes lower than that of the preceding dynode, whereby the gain of said photomultiplier tube circuit is reduced to substantially 0.

18. A coincident-counting scintillation spectrometer for detecting and measuring the activity of a radionuclide present in a sample, comprising:
1. first and second photomultiplier tube means responsive to scintillations from radioactivity decay events for producing electrical signals proportional in amplitude to the energy of the corresponding decay events,
2. first and second means for separately amplifying the electrical signals from said first and second photomultiplier tube means,
3. discriminator means connected to at least one of said amplifying means for passing only a selected amplitude band of amplified signals therethrough,
4. logic means responsive to discriminated simultaneous signals from said first and said second amplifying means,
5. means for counting said discriminated simultaneous signals as a measure of the activity of a radionuclide,
6. means for exposing a radionuclide having predetermined count-producing characteristics to said photomultiplier tube means, and
7. means for adjusting the gain of each of said photomultiplier tube means independent of the other of said photomultiplier tube means to produce a count at said counting means substantially equal to said predetermined count.

19. A summation type, coincident counting, scintillation spectrometer for detecting and measuring the activity of a radionuclide in a sample, comprising:
1. first and second photomultiplier tube means responsive to scintillations from radioactivity decay events for producing electrical signals proportional in amplitude to the energy of the corresponding decay events,
2. first logic means responsive to simultaneous signals from said first and second photomultiplier tube means and for producing a coincidence signal,
3. means for summing the electrical signals from said first and said second photomultiplier tube means and for producing a first summation signal,
4. means for amplifying said first summation signal,
5. discriminator means for passing only a selected band of amplified summation signals therethrough,
6. second logic means responsive to simultaneous signals from said first logic means and said discriminator means,
7. means for counting simultaneous signals from said second logic means as a measure of the activity of a radionuclide,
8. means for exposing a radionuclide having predetermined count-producing characteristics to said photomultiplier tube means, and
9. means for adjusting the gain of each of said photomultiplier tube means independent of the other of said photomultiplier tube means to produce a count at said counting means substantially equal to said predetermined count.

20. A scintillation spectrometer having external standardization, comprising:
1. first and second photomultiplier tube means responsive to scintillations from radioactivity decay events for producing electrical signals proportional in amplitude to the corresponding decay events,
2. means for amplifying the electrical signals from said first and second photomultiplier tube means,
3. discriminator means for passing only a selected amplitude band of amplified signals therethrough,
4. means for counting selected amplified signals as a measure of radioactivity,
5. means for disposing near said first and second photomultiplier tube means (i) a series of samples of known activity and varying degrees of quench, (ii) a quenched unknown sample, and (iii) a quenched unknown sample and a gamma-emitting standard, to correct for counting efficiency in said quenched unknown sample, and
6. means for adjusting the gain of one of said photomultiplier tube means independent of the gain of the other photomultiplier tube means.

21. A scintillation spectrometer having external standardization, comprising:

1. first and second photomultiplier tube means responsive to scintillations from radioactivity decay events for producing electrical signals proportional in amplitude to the energy of the corresponding decay events,
2. first logic means responsive to simultaneous signals from said first and second photomultiplier tube means and for producing a coincidence signal,
3. means for summing the electrical signals from said first and second photomultiplier tube means and for producing a first summation signal,
4. at least one amplification-discrimination means for amplifying said summation signal and for passing only a selected band of amplified summation signals therethrough,
5. second logic means responsive to simultaneous signals from said first logic means and said amplification-discrimination means,
6. means for counting said second simultaneous signals,
7. an additional amplification-discrimination means for amplifying said summation signal and for passing only a selected band of amplified summation signals therethrough,
8. means for disengaging one of said photomultiplier tubes and for counting amplified signals from said additional amplification-discrimination means and produced by the other tube as a measure of the gain of said one photomultiplier tube, and means for adjusting the gain of one of said photomultiplier tube means independent of the gain of the other photomultiplier tube means.

22. Spectrometer of claim 21 wherein said additional amplification-discrimination means includes two integral discrimination channels, and said counting means includes means for determining the ratio of signals from said integral discrimination channels.

* * * * *